US007884763B2

(12) United States Patent
Na et al.

(10) Patent No.: US 7,884,763 B2

(45) Date of Patent: Feb. 8, 2011

(54) ORTHOGONAL/PARTIAL ORTHOGONAL BEAMFORMING WEIGHT GENERATION FOR MIMO WIRELESS COMMUNICATION

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 404 days.

(21) Appl. No.: 12/164,335

(22) Filed: Jun. 30, 2008

(65) Prior Publication Data

US 2009/0322614 A1 Dec. 31, 2009

(51) Int. Cl.
*H01Q 3/00* (2006.01)

(52) U.S. Cl. .................................................... 342/377

(58) Field of Classification Search ................. 342/377, 342/372–373

See application file for complete search history.

(56) References Cited

U.S. PATENT DOCUMENTS 6,392,596 B1 * 5/2002 Lin et al. .................... 342/372
2009/0066577 A1 * 3/2009 Kim et al. .................. 342/373

FOREIGN PATENT DOCUMENTS

EP 1087545 A1 3/2001
WO 2008065462 A3 6/2008

OTHER PUBLICATIONS

Jindal, N.; , "MIMO Broadcast Channels With Finite-Rate Feedback," Information Theory, IEEE Transactions on , vol. 52, No. 11, pp. 5045-5060, Nov. 2006.*

Partial PCT International Search Report in counterpart International Application No. PCT/US2009/042047, dated Aug. 5, 2009.

* cited by examiner

*Primary Examiner*—Thomas H Tarcza
*Assistant Examiner*—Fred H Mull
(74) *Attorney, Agent, or Firm*—Edell, Shapiro & Finnan, LLC

(57) ABSTRACT

Techniques are provided for computing beamforming weight vectors useful for multiple-input multiple-output (MIMO) wireless transmission of multiple signals streams from a first device to a second device. The techniques involve computing a plurality of candidate beamforming weight vectors based on the one or more signals received at the plurality of antennas of the first device. A sequence of orthogonal/partially orthogonal beamforming weight vectors are computed from the plurality of candidate beamforming weight vectors. The sequence of orthogonal/partially orthogonal beamforming weight vectors are applied to multiple signal streams for simultaneous transmission to the second device via the plurality of antennas of the first device.

20 Claims, 6 Drawing Sheets

ORTHOGONAL/PARTIAL ORTHOGONAL BEAMFORMING WEIGHT GENERATION FOR MIMO WIRELESS COMMUNICATION

BACKGROUND

In wireless communication systems, antenna arrays are used at devices on one or both ends of a communication link to suppress multipath fading and interference and to increase system capacity by supporting multiple co-channel users and/or higher data rate transmission. In a frequency division duplex (FDD) system or a one-sounding time division duplex (TDD) multiple-input multiple-output (MIMO) wireless communication system, configuring a base station equipped with an antenna array to achieve improved downlink MIMO transmission performance is more difficult than improving the performance on an associated uplink due to a lack of information of estimated downlink channel coefficients. In general, a downlink channel covariance can be used to determine the downlink beamforming weights. However, in many situations an uplink channel covariance cannot be used to compute predicted or candidate downlink beamforming weights.

Current MIMO beamforming weights computation algorithms exist that in general require rather complex calculations, such as those associated with matrix inversions or eigenvalue decomposition. These types of computations use a significant amount of processing capability and consequently can place a significant burden on the computation resources in certain wireless MIMO communication products.

Thus, there is a need for a simpler orthogonal beamforming weight computation method that does not require complex computations such as matrix inversions or eigenvalue decompositions, and still achieve desirable performance levels.

DESCRIPTION OF EXAMPLE EMBODIMENTS

Overview

Techniques are provided for computing beamforming weight vectors useful for multiple-input multiple-output (MIMO) wireless transmission of multiple signals streams from a first device to a second device. The techniques involve computing a plurality of candidate beamforming weight vectors based on the one or more signals received at the plurality of antennas of the first device. A sequence of orthogonal/partially orthogonal beamforming weight vectors are computed from the plurality of candidate beamforming weight vectors. The sequence of orthogonal/partially orthogonal beamforming weight vectors are applied to multiple signal streams for simultaneous transmission to the second device via the plurality of antennas of the first device.

Figure 1:
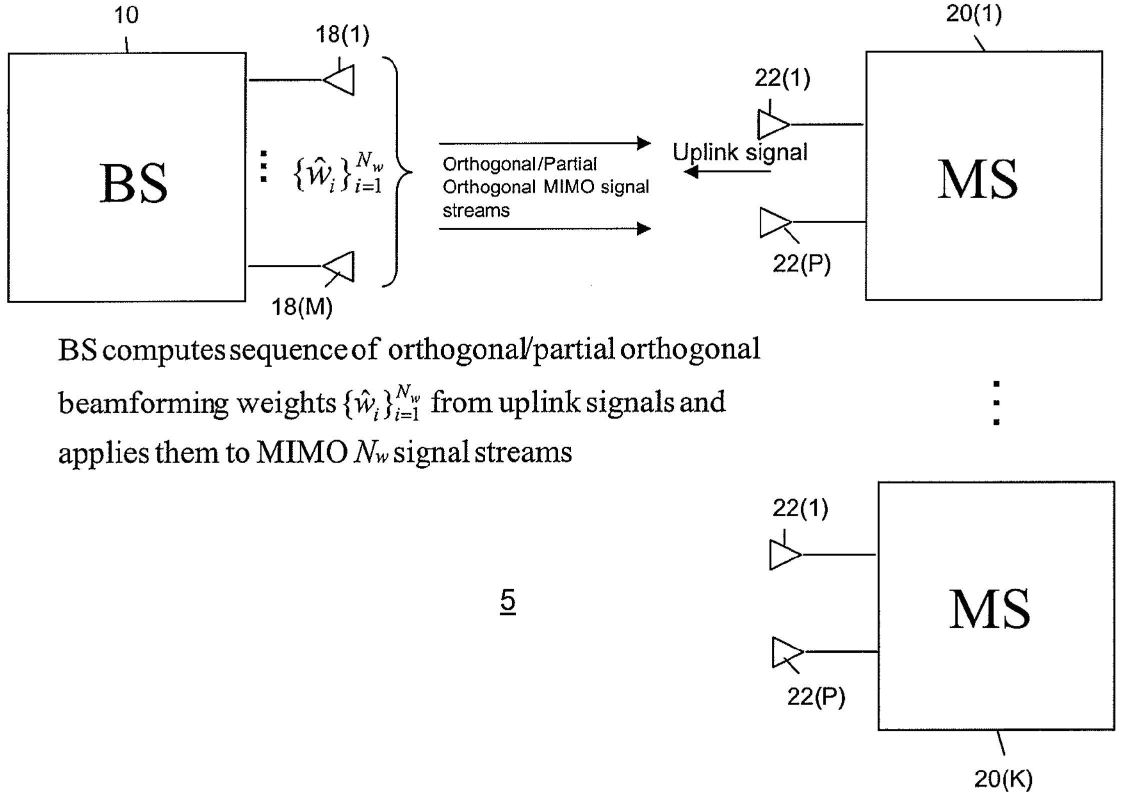
FIG. 1 is a block diagram showing an example of a wireless communication system in which a first communication device (e.g., base station) transmits multiple signals streams to a second communication device (e.g., mobile station) using orthogonal/partially orthogonal beamforming weight vectors.

Referring first to FIG. 1, a wireless radio communication system or network is shown generally at reference numeral 5 and comprises a first communication device, e.g., a base station (BS) 10, and a plurality of second communication devices, e.g., mobile stations (MS's) 20(1)-20(K). The BS 10 may connect to other wired data network facilities (not shown) and in that sense serves as a gateway or access point through which the MS's 20(1)-20(K) have access to those data network facilities.

The BS 10 comprises a plurality of antennas 18(1)-18(M) and the MS's 20(1)-20(K) may also comprise a plurality of antennas 22(1)-22(P). The BS 10 may wirelessly communicate with individual ones of the MS's 20(1)-20(K) using a wideband wireless communication protocol in which the bandwidth is much larger than the coherent frequency bandwidth. An example of such a wireless communication protocol is the IEEE 802.16 communication standard, also known commercially as WiMAX™.

Techniques are provided herein to compute values for beamforming weights that a first communication device, e.g., the BS 10, uses for multiple-input multiple-output (MIMO) wireless communication of multiple signal streams to a second communication device, e.g., MS 20(1). The BS 10 generates the beamforming weights based on the uplink channel information from the MS 20(1).

The following description makes reference to generating beamforming weights for a MIMO transmission process in frequency division duplex (FDD) or time division duplex (TDD) orthogonal frequency division multiple access (OFDMA) systems as an example only. These techniques may easily be extended to processes of beamforming weights generation in any FDD/TDD MIMO wireless communication system. The approach described herein uses relatively low complexity (and thus requires reduced processing resources) that can significantly improve the process of downlink beamforming in macrocell/microcell FDD/TDD MIMO systems in multipath environments.

Generally, the BS 10 computes a sequence of orthogonal or partially orthogonal (orthogonal/partially orthogonal) beamforming weights $\{\hat{w}_i\}_{i=1}^{N_w}$ from uplink signals that it receives from a MS, e.g., MS 20(1) and applies them to N, signal streams for MIMO transmission via antennas 18(1)-18(M) to the MS 20(1). The beamforming weights $\{\hat{w}_i\}_{i=1}^{N_w}$ are generated using a combination of one or more prediction processes and an orthogonal computation process so that the beamforming weights are orthogonal or at least partially orthogonal. The beamforming weights $\{\hat{w}_i\}_{i=1}^{N_w}$ can be used for space-time code (STC) transmission or MIMO transmission.

Figure 2:
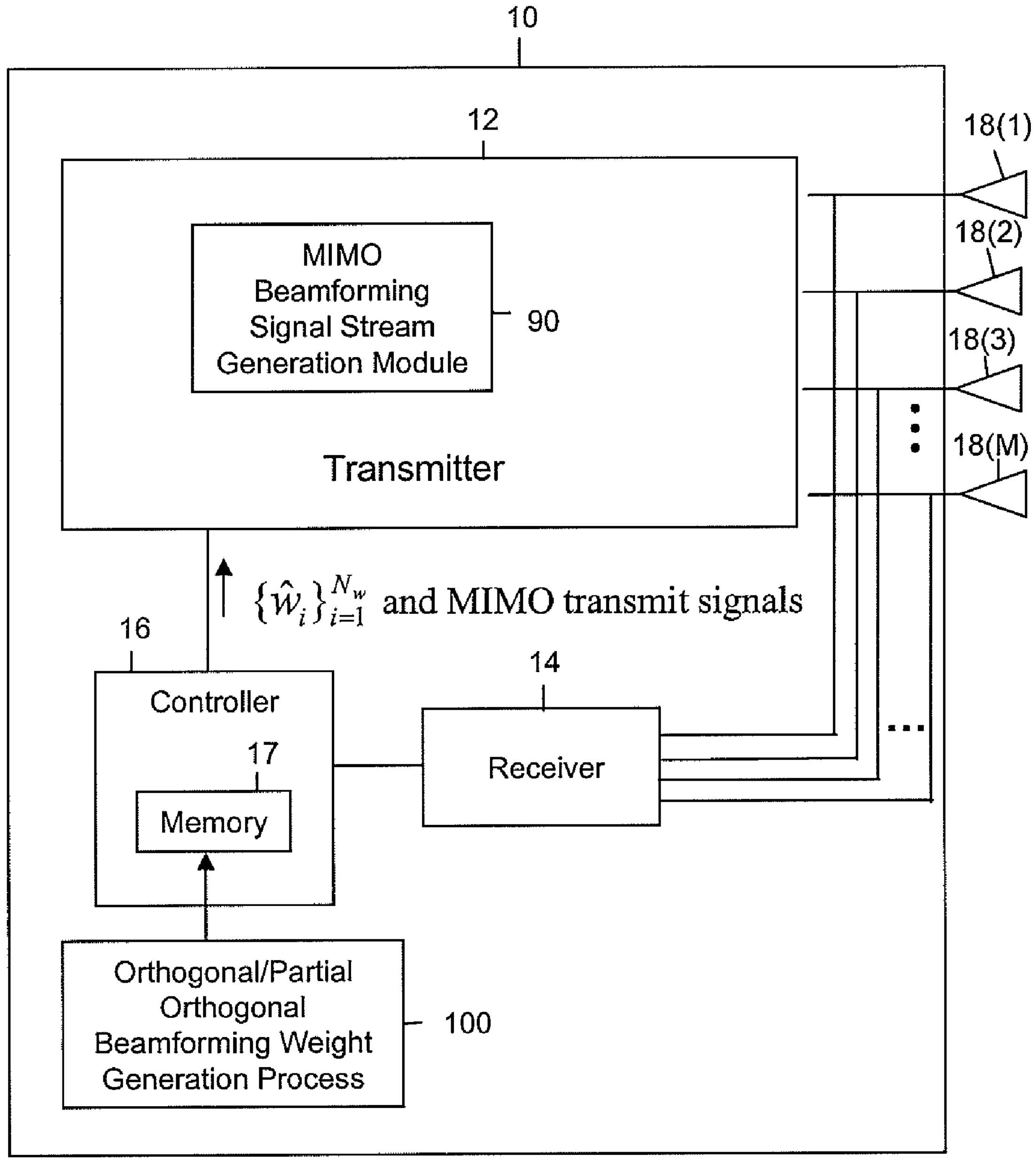
FIG. 2 is an example of a block diagram of a wireless communication device (e.g., base station) that is configured to compute orthogonal/partially orthogonal beamforming weight vectors.

Turning to FIG. 2, an example of a block diagram is shown that there is a wireless communication device that may serve as a BS 10. The BS 10 comprises a transmitter 12, a receiver 14 and a controller 16. The controller 16 supplies the data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-toanalog converters (DACs) in the various signal paths to convert between analog and digital signals.

The transmitter 12 may comprise individual transmitter circuits that supply respective upconverted signals to corresponding ones of a plurality of antennas (antennas 18(1)-18(M)) for transmission. To this end, the transmitter 12 comprises a MIMO beamforming signal stream generation module 90 that applies the sequence of beamforming weights $\{\hat{w}_i\}_{i=1}^{N_w}$ (supplied to it by the controller 16) to $N_w$ multiple signal streams to be transmitted via antennas 18(1)-18(M). The receiver 14 receives the signals detected by each of the antennas 18(1)-18(M) and supplies corresponding antenna-specific receive signals to controller 16. It is understood that the receiver 14 may comprise a plurality of receiver circuits, each for a corresponding one of a plurality of antennas. For simplicity, these individual receiver circuits and individual transmitter circuits are not shown.

The controller 16 comprises a memory 17 or other data storage block that stores data used for the techniques described herein. The memory 17 may be separate or part of the controller 16. Instructions for performing an orthogonal/partial orthogonal beamforming weight generation process 100 may be stored in the memory 17 for execution by the controller 16. The process 100 generates the sequence of beamforming weights $\{\hat{w}_i\}_{i=1}^{N_w}$ that are supplied to the transmitter 12 for use by the module 90.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the MIMO beamforming signal stream generation module 90 and the orthogonal/partial orthogonal beamforming weight generation process 100 may be performed by the same logic component, e.g., the controller 16.

A brief description of an OFDMA signaling scheme, such as the one used in a WiMAX system, is described by way of background. The OFDMA symbol structure comprises three types of subcarriers: data subcarriers for data transmission, pilot subcarriers for estimation and synchronization purposes, and null subcarriers for no transmission but used as guard bands and for DC carriers. Active (data and pilot) subcarriers are grouped into subsets of subcarriers called subchannels for use in both the uplink and downlink. For example, in a WiMAX system, the minimum frequency-time resource unit of sub-channelization is one slot, which is equal to 48 data tones (subcarriers).

Furthermore, in a WiMAX system there are two types of subcarrier permutations for sub-channelization; diversity and contiguous. The diversity permutation allocates subcarriers pseudo-randomly to form a sub-channel, and in so doing provides for frequency diversity and inter-cell interference averaging. The diversity permutations comprise a fully used subcarrier (FUSC) mode for the downlink and a partially used subcarrier (PUSC) mode for the downlink and the uplink. In the downlink PUSC mode, for each pair of OFDM symbols, the available or usable subcarriers are grouped into "clusters" containing 14 contiguous subcarriers per symbol period, with pilot and data allocations in each cluster in the even and odd symbols.

A re-arranging scheme is used to form groups of clusters such that each group is made up of clusters that are distributed throughout a wide frequency band space spanned by a plurality of subcarriers. The term "frequency band space" refers to the available frequency subcarriers that span a relatively wide frequency band in which the OFMDA techniques are used. When the FFT size L=128, a sub-channel in a group contains two (2) clusters and is made up of 48 data subcarriers and eight (8) pilot subcarriers. When the FFT size L=512, a downlink PUSC subchannel in a major group contains some data subcarriers in ten (10) clusters and is made up of 48 data subcarriers and can use forty (40) pilot subcarriers.

The data subcarriers in each group are further permutated to generate subchannels within the group. The data subcarriers in the cluster are distributed to multiple subchannels.

This techniques described herein are applicable to the downlink beamforming generation process in any MIMO wireless communication system that requires estimating accurate downlink channel coefficients, such as in FDD/TDD CDMA (code division multiple access) systems, or FDD/TDD OFDMA systems. The following description is made for a process to generate multiple downlink beamforming weights in a MIMO FDD/TDD OFDMA system, as one example. The adaptive downlink beamforming weights are generated with a combination of beamforming weight prediction and an orthogonal computation process. The multiple beamforming weights are orthogonal or partially orthogonal and may be used for space-time coding transmissions or MIMO transmissions in WiMAX system, for example.

The BS computes a channel covariance for every MS if every MS experiences different channel conditions. To do so, the BS computes estimated uplink channel coefficients in the frequency domain for a MS based on signals received from that MS, as $H_{UL}=[H_{UL,1}\ H_{UL,2} \ldots H_{UL,M}]^T$, where T stands for Transpose operation, 'UL' stands for uplink and M is the number of antennas at the BS. $R_{UL}$ is the uplink channel covariance $$R_{UL} = \frac{1}{N_e}\sum_{i=1}^{N_e} H_{i,UL}(H_{i,UL})^H$$

and average uplink channel covariance, where $N_e$ is the number of received signals ([1,∞)) with the same direction of arrivals (DOAs) during a coherence time interval (i.e., the time interval during which phase and magnitude of a propagating wave are, on average, predictable or constant) and H stands for Hermitian operation.

Figure 3:
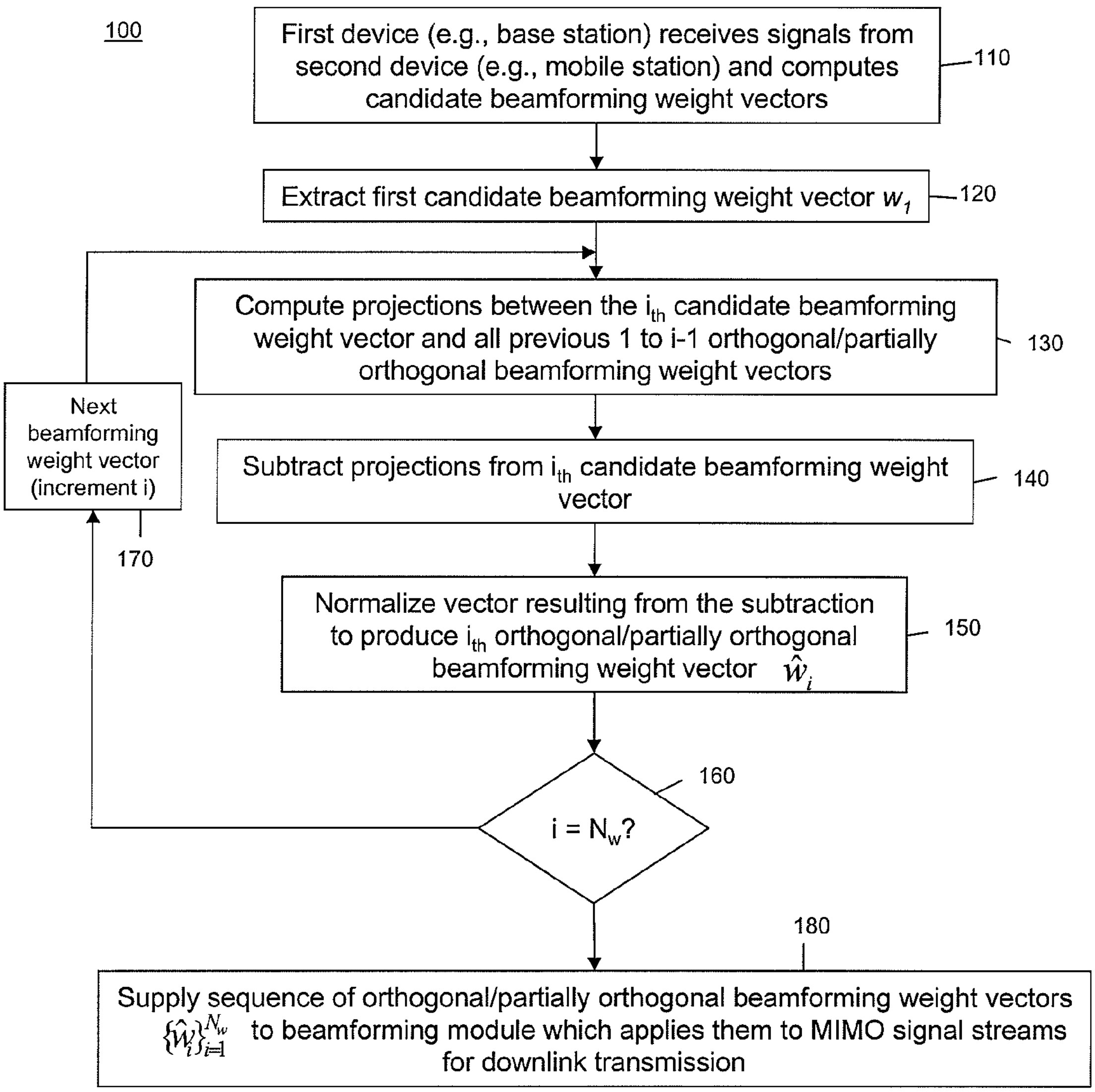
FIG. 3 is an example of a flow chart that depicts a process for computing orthogonal/partially orthogonal beamforming weight vectors.

Turning now to FIG. 3, the orthogonal/partially orthogonal beamforming weight generation process 100 is now described. At 110, the first device, e.g., BS 10, receives one or more signals at is plurality of antennas that are transmitted by a second device, e.g., a MS, and computes candidate beamforming weights from these signals. There are numerous ways to compute candidate beamforming weights from uplink signals, examples of which are described hereinafter in conjunction with FIGS. 4-9. The sequence of candidate beamforming weights are represented by a plurality of vectors referred to as candidate beamforming weight vectors $\{\hat{w}_i\}_{i-1}^{N_w}$, where the total number of vectors is $N_w$, for $N_w \geqq 1$ which corresponds to the number of orthogonal/partially orthogonal signal streams to be transmitted from the first device to the second device.

At 120, the first candidate beamforming weight vector $w_1$ from the sequence of candidate beamforming weight vectors $\{\hat{w}_i\}_{i=1}^{N_w}$ is extracted and taken as the first in the sequence of orthogonal/partially orthogonal beamforming weight vector $\hat{w}_1$.

The functions associated with 130-170 involve computing a sequence of orthogonal/partially orthogonal beamforming weight vectors $\{\hat{w}_i\}_{i=1}^{N_w}$ from the candidate beamforming weight vectors $\{w_n\}_{n=1}^{N_w}$ computed at 110. These functions are computed for each beamforming weight vector in the sequence of orthogonal/partially orthogonal beamforming weight vectors $\{\hat{w}_i\}_{i=1}^{N_w}$.

At 130, for the $i_{th}$ orthogonal/partially orthogonal beamforming weight vector $\hat{w}_1$ (for i≧2), projections are computed between the $i_{th}$ candidate beamforming weight vector $w_i$ and all previous (1 to i−1) orthogonal/partially orthogonal beamforming weight vectors. This projection computation may be represented by the equation:

$$\sum_{k=1}^{i-1} \frac{\beta_{k,i}\hat{w}_k^H w_i}{norm(\hat{w}_k)}\hat{w}_k,$$

where α and β are practical weighted scalars. For example, α=1.2 and β=1, or α=1 and β=0.8, or α=1 and β=1. These projections constitute the spatial overlap to a candidate beamforming vector.

At 140, the projections computed at 130 are subtracted from the it, candidate beamforming vector:

$$\hat{w}_i = \alpha_{i,i} w_i - \sum_{k=1}^{i-1} \frac{\beta_{k,i}\hat{w}_k^H w_i}{norm(\hat{w}_k)}\hat{w}_k.$$

Thus, the result of this subtraction is a vector that is orthogonal to all of the prior vectors in the sequence $\{\hat{w}_i\}_{i=1}^{N_w}$.

At 150, the $i_{th}$ orthogonal/partially orthogonal beamforming weight vector is normalized to boost the power associated with its orthogonal portion:

$$\hat{w}_i=\hat{w}_i/\text{norm}(\hat{w}_i).$$

The functions of 130-170 are repeated for each beamforming weight vector in the sequence $\{\hat{w}_i\}_{i=1}^{N_w}$ as indicated at 160. Then, the sequence of orthogonal/partially orthogonal beamforming weight vectors $\{\hat{w}_i\}_{i=1}^{N_w}$, are supplied to the beamforming module which applies them to MIMO signal streams for transmission.

There are several methods for estimating/computing the candidate beamforming weights at 110. Examples of several methods that can be used separately or in combination are now described. In one example, a set of candidate beamforming weight vectors is computed using each of a plurality of methods or techniques to produce a plurality of sets of candidate beamforming weight vectors. Correlation rate and predicted average beamforming performance among candidate beamforming weight vectors within each set is determined and one of the plurality of sets of candidate beamforming weight vectors is selected based on the degree of correlation and predicted average beamforming performance among its candidate beamforming weight vectors. The sets of candidate beamforming weight vectors may be prioritized by the correlation rate and predicted average beamforming performance, whereby the set of candidate beamforming weight vectors with the lowest correlation and best predicted average beamforming performance is given the highest priority and the set of candidate beamforming weight vectors with the highest correlation is given the lowest priority.

Normalized Average Estimate of Uplink Channel Coefficients

One technique to compute the candidate beamforming weights is to set the beamforming weight was the normalized average of the estimated uplink channel coefficient, $w=\overline{H}_{UL}/\text{norm}(\overline{H}_{UL})$. This method thus involves estimating the uplink channel coefficients in a frequency subchannel, normalizing the estimated channel coefficients and setting the normalized estimated channel coefficients as the candidate beamforming weights.

DOA Method

Figure 4:
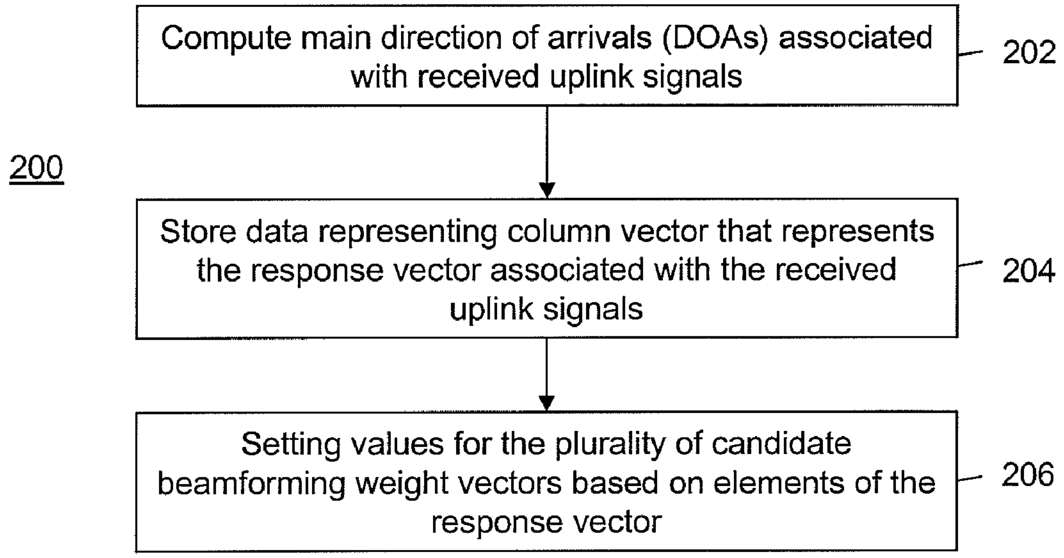
FIGS. 4-9 are examples of flow charts for various methods that are useful to compute candidate beamforming weight vectors from which the orthogonal/partially orthogonal beamforming weight vectors are computed.

Reference is now made to FIG. 4 for a description of this method shown generally at reference numeral 200. This method uses the DOA of signals received at the plurality of antennas of the BS to compute candidate beamforming weights. At 202, based on received uplink signals, the main DOAs are estimated as $\{\theta_1, \theta_2, \ldots, \theta_L\}$. A column vector $A(\theta,\lambda)$ is defined that represents the steering vector or response vector associated with the uplink signals received at the BS antennas, where λ is the uplink or downlink carrier wavelength ($\lambda_{UL}$ or $\lambda_{DL}$). Data representing the response vector is stored at 204. Values for the candidate beamforming weights are set based on elements of the response vector, where, for example, $w=A(\theta_1,\lambda_{DL})$ or $w=A(\theta_2,\lambda_{DL})$, . . . , or $w=A(\theta_L,\lambda_{DL})$.

Use of Channel Covariance Matrix—Method 1

Figure 5:
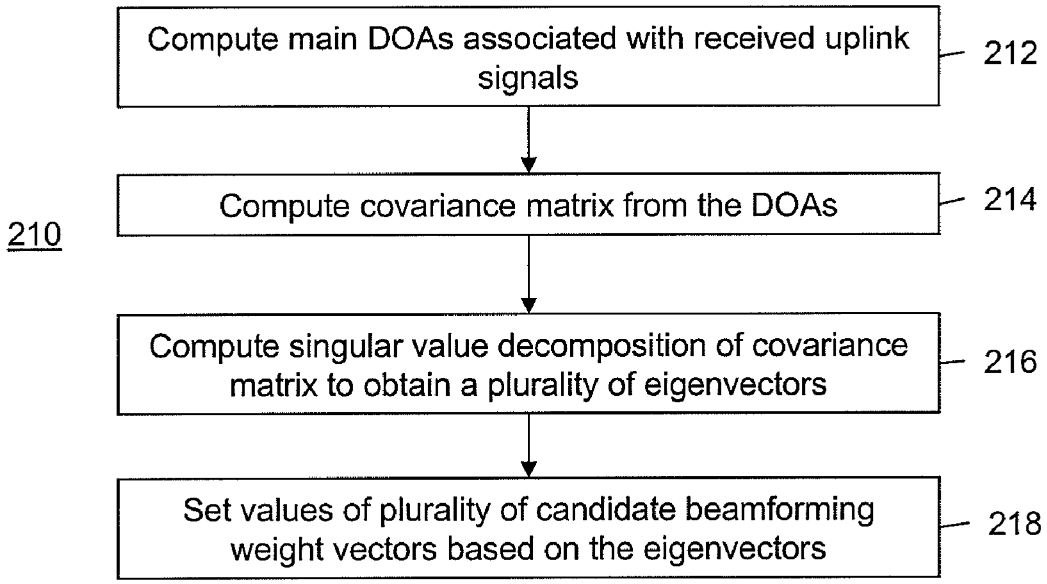

Reference is now made to FIG. 5 for a description of still another method for computing candidate beamforming weight vectors. This method, shown generally at 210, involves computing estimated main DOAs (as explained above in conjunction with FIG. 4) at 212. At 214, the main DOAs are used to generate a covariance matrix $\tilde{R}=A(\theta_1,\lambda_{DL})A(\theta_1,\lambda_{DL})^H+A(\theta_2, \theta_{DL})A(\theta_2,\lambda_{DL})^H$. Next, at 216, a singular value decomposition is computed of the covariance matrix to obtain a plurality of eigenvectors. For example, the M eigenvectors of the generated covariance matrix $\tilde{R}$ are $\{\tilde{U}_1, \tilde{U}_2, \ldots, \tilde{U}_M\}$ corresponding to the eigenvalues $\{\tilde{\Lambda},\tilde{\theta}_2,\ldots,\tilde{\theta}_M\}$ with $\tilde{\Lambda}_1\geqq\tilde{\Lambda}_2\geqq\ldots\geqq\tilde{\Lambda}_M$. At 218, values for the candidate beamforming weights are set based on the eigenvectors, such as equal to the principle (or any) eigenvector of the generated covariance matrix, or the combination of eigenvectors, e.g., $\tilde{U}_1$ or/and $\tilde{U}_2$.

Use of Channel Covariance Matrix—Method 2

Figure 6:
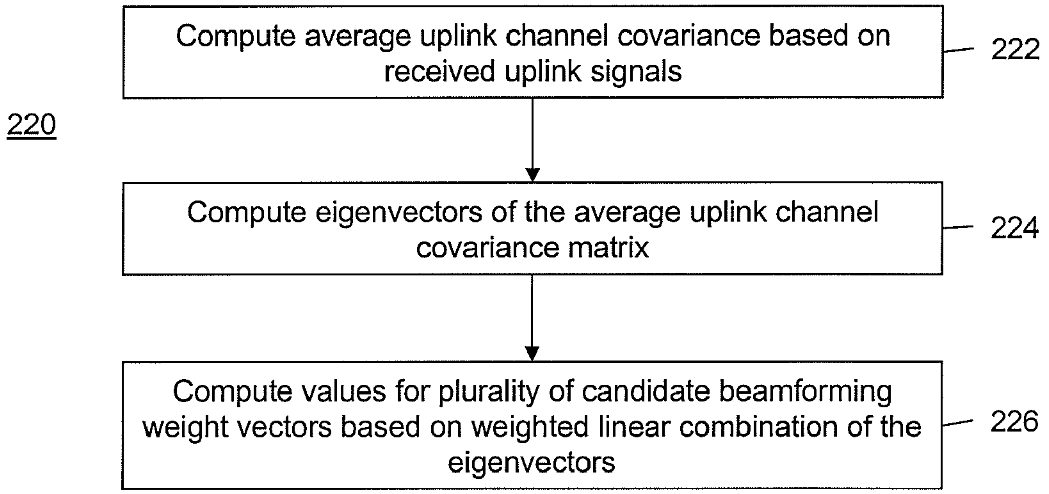

Reference is made to FIG. 6 for a description of another method for computing candidate beamforming weights. In this method, shown generally at 220, the average uplink channel covariance matrix $R_{UL}$ is computed at 222, where $$R_{UL} = \frac{1}{N_e}\sum_{i=1}^{N_e} H_{i,UL}(H_{i,UL})^H,\ N_e$$

is the number of received signals [1,∞) with the main DOAs in the coherence time and H stands for Hermitian operation. At 224, the M eigenvectors $\{U_1, U_2, \ldots, U_M\}$ of the average uplink channel covariance matrix are computed. Then, at 226, values for the candidate beamforming weight vectors are computed based on a weighted linear combination of the eigenvectors, such as, $w=(c_1U_1+c_2U_2+\ldots+c_MU_M)/\text{norm}(c_1U_1+c_2U_2+\ldots+c_MU_M)$, where $\{c_j\}_{j=1}^M$ are complex weighting values (some of which may be set to zero).

Channel Covariance Matrix Method for FDD Systems

Figure 7:
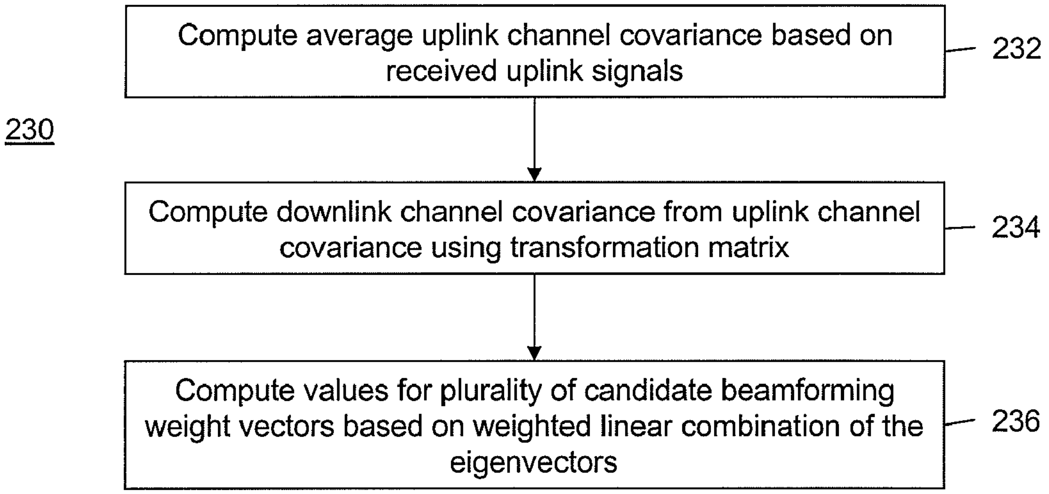

Turning now to FIG. 7, another method is shown at 230 for computing the plurality of candidate downlink beamforming weight vectors in an FDD system. At 232, the uplink covariance is computed as described above in connection with FIG. 6. Then, at 234, the estimated downlink covariance $R_{DL}$ is computed from the uplink covariance as $R_{DL}=R_{UL}C_T \cdot C_T$ is a constant M×M transformation matrix that is fixed after designing some system parameters that are based on the number of antennas, the spacing of the antennas, the number of spatial sectors and the uplink and downlink carrier frequencies. Thus, the transformation matrix $C_T$ is computed a priori. At 236, values for the candidate beamforming weight vectors are set based on a weighted linear combination of the eigenvectors of the average downlink channel covariance matrix $R_{DL}$, or the principal eigenvector of $R_{DL}$. For example, if the M eigenvectors of average downlink channel covariance matrix $R_{DL}$ are $\{V_1, V_2, \ldots, V_M\}$, the candidate beamforming weight w can be written as $w=(d_1V_1+d_2V_2+\ldots+d_MV_M)/\text{norm}(d_1V_1+d_2V_2+\ldots+d_MV_M)$, where $\{d_j\}_{j=1}^{M}$ are complex weighting values some of which may be set to zero.

Spatial Subspace Decomposition Method

Figure 8:
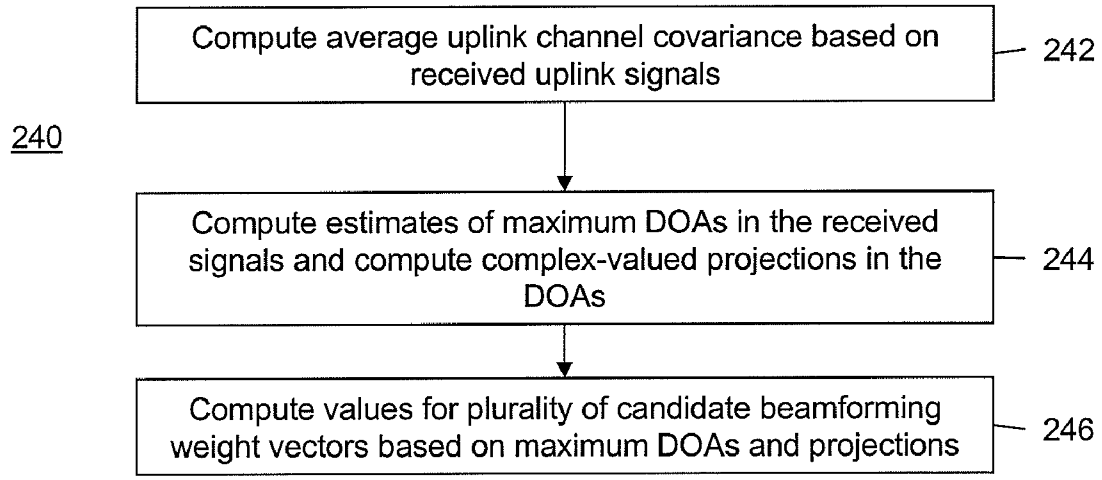

Referring to FIG. 8, another method, shown generally at 240, is described for computing the candidate beamforming weight vectors using a spatial subspace decomposition applied to the average uplink channel covariance matrix. At 242, the average uplink channel covariance matrix is computed using the computations described above. At 244, estimates of K maximum DOAs with the angles $\{\theta_1, \theta_2, \ldots \theta_K\}$ are computed from the received uplink signals and the complex-valued projections $p=[p_1, p_2, \ldots p_K]$ in the K DOAs are computed. At 246, values for the candidate beamforming weight vectors are computed from the K maximum DOAs and projections. For example, the beamforming weights are computed as $w=f_1p_1A(\theta_1,\lambda_{DL})+f_2p_2A(\theta_2,\lambda_{DL})+\ldots+f_Kp_KA(\theta_K,\lambda_{DL})$ or $w=\text{pinv}([A(\theta_1,\lambda_{DL})A(\theta_2,\lambda_{DL})\ldots A(\theta_K,\lambda_{DL})])[f_1p_1\ f_2p_2\ldots f_Kp_K]^T$, where $\{f_k\}_{k=1}^{K}$ are instances of a complex random variable $\eta e^{j\beta}$, $\eta$ is a uniformly random variable with mean 1 and $\beta$ is a uniformly random variable in the range or $[0, 2\pi]$, and pinv( ) is a Pseudo-inverse operation. The candidate beamforming weights are then normalized. The column vector $A(\theta,\lambda)$ is defined as described above. For example, for a uniform linear array (ULA), the column vector $A(\theta,\lambda)$ is $$A(\theta,\lambda)=\left[\,1\quad e^{j\frac{2\pi D}{\lambda}\sin(\theta)}\quad\ldots\quad e^{j\frac{2\pi D}{\lambda}(M-1)\sin(\theta)}\,\right]^T,$$

where D is the distance between two adjacent antennas, and for a uniform circular array (UCA), $$A(\theta,\lambda)=\left[\,e^{-j\frac{2\pi r}{\lambda}\cos(\theta)}\quad e^{-j\frac{2\pi r}{\lambda}\cos\left(\theta-\frac{2\pi}{M}\right)}\quad\ldots\quad e^{-j\frac{2\pi r}{\lambda}\cos\left(\theta-\frac{(M-1)2\pi}{M}\right)}\,\right]^T,$$

where r is the radius of the circular array.

Channel Tap-Based Method

Figure 9:
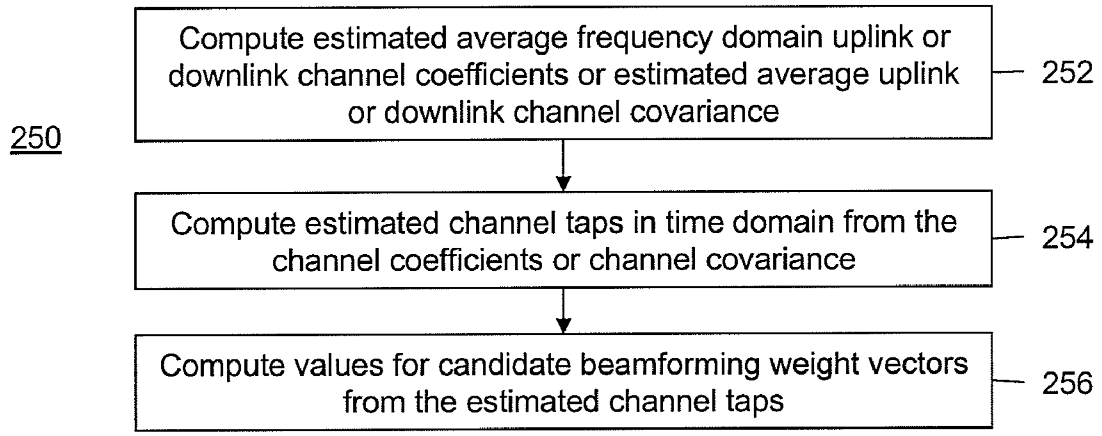

FIG. 9 illustrates still another method, shown generally at 250, for computing candidate beamforming weights using time-domain based signal analysis. First, at 252, the average frequency domain uplink/downlink channel coefficients or estimate average uplink/downlink channel covariance matrix is computed. Next, at 254, J maximum estimated channel taps in the time domain are computed as $h=[h_1\ h_2\ldots h_J]$ with the time delays $\tau=[\tau_1\ \tau_2\ldots\tau_J]$ from the channel coefficients or channel covariance, such that the channel is expressed in the form $h_1\exp(j2n\tau_1y)+h_2\exp(j2n\tau_2y)+\ldots+h_J\exp(j2n\tau_Jy)$, where y denotes a frequency band space. For example, at 254, using pilot and/or data signals (subcarriers) or ranging signals contained in received uplink signals, estimated channel coefficients/or channel covariance matrix in different frequency bands is/are computed. The estimated channel coefficients and/or channel covariance matrix is then used to derive the time domain channel taps and time delays by least squared or minimum mean squared estimation iterative methods or other methods. Values for the candidate beamforming weight vectors for a frequency band space y are computed as $w=g_1h_1\exp(j2\pi\tau_1y)+g_2h_2\exp(j2\pi\tau_2y)+\ldots+g_Jh_J\exp(j2\pi\tau_Jy)$, where $\{g_k\}_{k=1}^{J}$ are instances of a complex random variable $\eta e^{j\beta}$, $\eta$ is a uniformly random variable with mean 1 and $\beta$ is a uniformly random variable in the range or $[0, 2\pi]$. The beamforming weights are then normalized.

Using any one or more of the methods described above, $\xi$ beamforming weights can be computed and then those weights used to regenerate a covariance matrix. For example, the two column vectors of beamforming weights as $\{w_1,w_2\}$ are used to generate a covariance matrix $\hat{R}$ as $\hat{R}=w_1w_1^H+w_2w_2^H$. The singular value decomposition may then be computed on the regenerated covariance matrix to obtain the eigenvectors. New or updated values for the candidate beamforming weights may then be set as the principle (or any) eigenvector of the generated covariance matrix, or the combination of eigenvectors. If M eigenvectors of the generated covariance matrix $\hat{R}$ are $\{\hat{U}_1, \hat{U}_2, \ldots, \hat{U}_M\}$ corresponding to the eigenvalues $\{\tilde{\Lambda}_1, \tilde{\Lambda}_2, \ldots, \tilde{\Lambda}_M\}$, then the beamforming weights may be set as $\hat{U}_1$ or/and $\hat{U}_2$.

The techniques for computing beamforming weight vectors described herein significantly improve the downlink beamforming performance with low computation complexity, particularly when accurate downlink channel coefficients are not available.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:

at a plurality of antennas of a first device, receiving one or more signals transmitted by a second device;

computing a plurality of candidate beamforming weight vectors based on the one or more signals received at the plurality of antennas of the first device;

computing a sequence of orthogonal/partially orthogonal beamforming weight vectors from the plurality of candidate beamforming weight vectors; and applying the sequence of orthogonal/partially orthogonal beamforming weight vectors to multiple signal streams for simultaneous transmission to the second device via the plurality of antennas of the first device.

2. The method of claim 1, wherein computing the sequence of orthogonal/partially orthogonal beamforming weight vectors comprises, for an ith orthogonal/partially orthogonal beamforming weight vector in the sequence:

computing projections between the ith candidate beamforming weight vector and all previous 1 to i−1 candidate beamforming weight vectors;

subtracting the projections from the ith candidate beamforming weight vector; and normalizing a vector resulting from the subtracting to produce the ith orthogonal/partially orthogonal beamforming weight vector.

3. The method of claim 1, wherein computing the plurality of candidate beamforming weight vectors comprises computing estimates of the uplink channel coefficients in a frequency subchannel based on the one or more received signals, normalizing the estimates of the uplink channel coefficients and setting the plurality of candidate beamforming weight vectors to the normalized estimated uplink channel coefficients.

4. The method of claim 1, wherein computing the plurality of candidate beamforming weight vectors comprises computing direction of arrival data $\{\theta_1, \theta_2, \ldots, \theta_L\}$ associated with the one or more received signals, storing data for a column vector $A(\theta,\lambda)$ that represents a response vector associated with the one or more signals received at the plurality of antennas, where $\lambda$ is the carrier wavelength of the one more signals, and setting the plurality of candidate beamforming weight vectors based on elements of the response vector.

5. The method of claim 1, wherein computing the plurality of candidate beamforming weight vectors comprises computing direction of arrival data associated with the one or more received signals, computing a covariance matrix associated with the direction of arrival data, computing a singular value decomposition from the covariance matrix to obtain a plurality of eigenvectors of the covariance matrix, and setting the plurality of candidate beamforming weights as at least one of the eigenvectors of the covariance matrix.

6. The method of claim 1, wherein computing the plurality of candidate beamforming weight vectors comprises computing an average uplink channel covariance from the one or more received signals, computing the eigenvectors of the average uplink channel covariance matrix, and computing the plurality of candidate weight vectors from the eigenvectors.

7. The method of claim 1, wherein computing the plurality of candidate beamforming weight vectors comprises computing an average uplink channel covariance from the one or more received signals, computing an estimated downlink channel covariance from the average uplink channel covariance and a transformation matrix that is based on the number of antennas of the first device, the spacing of the antennas and the number of spatial sectors, and setting the plurality of candidate beamforming weight vectors to an eigenvector of the average downlink channel covariance.

8. The method of claim 1, wherein computing the plurality of candidate beamforming weight vectors comprises computing an estimate of maximum direction of arrivals associated with the one or more received signals and complex-valued projections of the maximum direction of arrivals, and computing the plurality of candidate beamforming weight vectors from the maximum direction of arrivals and the complex-valued projections.

9. The method of claim 1, wherein computing the plurality of candidate beamforming weight vectors comprises computing an average uplink channel covariance from the one or more received signals, computing J maximum estimated channel taps in the time domain $h=[h_1\ h_2 \ldots h_J]$ with the time delays $\tau=[\tau_1\ \tau_2 \ldots \tau_J]$ from the uplink channel covariance, and computing the plurality of candidate beamforming weights using the estimated channel taps and time delays.

10. The method of claim 1, and further comprising computing a covariance matrix from the plurality of candidate beamforming weight vectors, computing a singular value decomposition of the covariance matrix to produce a plurality of eigenvectors, and setting new or updated values for plurality of candidate beamforming weight vectors based on any one or more of the plurality of eigenvectors.

11. The method of claim 1, wherein computing the plurality of candidate beamforming weight vectors comprises computing a set of candidate beamforming weight vectors using each of a plurality of methods to produce a plurality of sets of candidate beamforming weight vectors, determining correlation rate and predicted average beamforming performance among candidate beamforming weight vectors within each set and selecting one of the plurality of sets of candidate beamforming weight vectors based on the degree of correlation and predicted average beamforming performance among its candidate beamforming weight vectors.

12. An apparatus comprising:

a plurality of antennas;

a receiver that is configured to process signals detected by the plurality of antennas;

a controller coupled to the receiver, wherein the controller is configured to:

compute a plurality of candidate beamforming weight vectors based on one or more signals received at the plurality of antennas; and compute a sequence of orthogonal/partially orthogonal beamforming weight vectors from the plurality of candidate beamforming weight vectors;

a transmitter coupled to the controller, wherein the transmitter receives the sequence of orthogonal/partially orthogonal beamforming weight vectors from the controller and applies them to multiple signal streams for simultaneous transmission to via the plurality of antennas.

13. The apparatus of claim 12, wherein the controller is configured to compute the sequence of orthogonal/partially orthogonal beamforming weight vectors by, for an ith orthogonal/partially orthogonal beamforming weight vector in the sequence:

computing projections between the ith candidate beamforming weight vector and all previous 1 to i−1 candidate beamforming weight vectors;

subtracting the projections from the ith candidate beamforming weight vector; and normalizing a vector resulting from the subtracting to produce the ith orthogonal/partially orthogonal beamforming weight vector.

14. The apparatus of claim 12, wherein the controller is configured to compute the plurality of candidate beamforming weight vectors by computing estimates of the uplink channel coefficients in a frequency subchannel based on the one or more received signals, normalizing the estimates of the uplink channel coefficients and setting the plurality of candidate beamforming weight vectors to the normalized estimated uplink channel coefficients.

15. The apparatus of claim 12, wherein the controller is further configured to compute a covariance matrix from the plurality of candidate beamforming weight vectors, compute a singular value decomposition of the covariance matrix to produce a plurality of eigenvectors, and set new or updated values for plurality of candidate beamforming weight vectors based on any one or more of the plurality of eigenvectors.

16. The apparatus of claim 12, wherein the controller is configured to compute the plurality of candidate beamforming weight vectors by computing a set of candidate beamforming weight vectors using each of a plurality of methods to produce a plurality of sets of candidate beamforming weight vectors, determining correlation rate and predicted average beamforming performance among candidate beamforming weight vectors within each set and selecting one of the plurality of sets of candidate beamforming weight vectors based on the degree of correlation and predicted average beamforming performance among its candidate beamforming weight vectors.

17. Logic encoded in one or more tangible media for execution and when executed operable to:

compute a plurality of candidate beamforming weight vectors based on one or more signals received from a second device at a plurality of antennas of a first device;

compute a sequence of orthogonal/partially orthogonal beamforming weight vectors from the plurality of candidate beamforming weight vectors; and apply the sequence of orthogonal/partially orthogonal beamforming weight vectors to multiple signal streams for simultaneous transmission to the second device via the plurality of antennas of the first device.

18. The logic of claim 17, wherein the logic for computing the sequence of orthogonal/partially orthogonal beamforming weight vectors from the plurality of candidate beamforming weight vectors comprises logic for an ith orthogonal/partially orthogonal beamforming weight vector in the sequence:

computing projections between the ith candidate beamforming weight vector and all previous 1 to i−1 candidate beamforming weight vectors;

subtracting the projections from the ith candidate beamforming weight vector; and normalizing a vector resulting from the subtracting to produce the ith orthogonal/partially orthogonal beamforming weight vector.

19. The logic of claim 17, and further comprising logic for computing a covariance matrix from the plurality of candidate beamforming weight vectors, computing a singular value decomposition of the covariance matrix to produce a plurality of eigenvectors, and setting new or updated values for plurality of candidate beamforming weight vectors based on any one or more of the plurality of eigenvectors.

20. The logic of claim 17, wherein the logic from computing the plurality of candidate beamforming weight vectors comprises logic for computing a set of candidate beamforming weight vectors using each of a plurality of methods to produce a plurality of sets of candidate beamforming weight vectors, determining correlation rate and predicted average beamforming performance among candidate beamforming weight vectors within each set and selecting one of the plurality of sets of candidate beamforming weight vectors based on the degree of correlation and predicted average beamforming performance among its candidate beamforming weight vectors.

* * * * *